(12) United States Patent
Butkievich et al.

(10) Patent No.: US 6,350,078 B1
(45) Date of Patent: Feb. 26, 2002

(54) SHAFT DEPRESSOR FOR A SLAP YOKE IN A STEERING ASSEMBLY

(75) Inventors: Daniel Joseph Butkievich, Oxford; Walter Crudele, Middlebury; Julio Costa, Waterbury, all of CT (US)

(73) Assignee: The Torrington Company, Torrington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,651

(22) Filed: Sep. 24, 1999

(51) Int. Cl.⁷ .............................................. F16D 1/00
(52) U.S. Cl. .................. 403/290; 24/569; 269/224; 269/254 R; 464/89; 464/182
(58) Field of Search .................. 464/134, 182, 464/89; 403/316, 317, 290; 411/383, 399, 510, 535; 29/281.1; 269/254 R, 224; 24/135 K, 279, 569, 454

(56) References Cited

U.S. PATENT DOCUMENTS

| | | | | |
|---|---|---|---|---|
| 467,866 A | * | 1/1892 | Sutley et al. ........... | 403/290 X |
| 905,524 A | * | 12/1908 | Hanson .................. | 464/182 X |
| 3,055,654 A | * | 9/1962 | Harrison et al. ........ | 269/224 X |
| 4,142,811 A | * | 3/1979 | Burnham ................ | 403/290 |
| 4,976,715 A | * | 12/1990 | Bays et al. ............. | 411/510 X |
| 5,165,817 A | * | 11/1992 | Hoblingre et al. ....... | 403/290 X |
| 5,232,322 A | * | 8/1993 | Regensburger ......... | 411/510 X |
| 6,135,667 A | * | 10/2000 | Debisschop ............ | 403/290 |
| 6,202,265 B1 | * | 3/2001 | Caine .................... | 24/569 X |

FOREIGN PATENT DOCUMENTS

| | | |
|---|---|---|
| DE | 4017424 | 12/1991 |
| DE | 19829304 | 2/1999 |
| EP | 0309344 | 3/1989 |

* cited by examiner

*Primary Examiner*—Lynne H. Browne
*Assistant Examiner*—Greg Binda
(74) *Attorney, Agent, or Firm*—John C. Bigler; Robert F. Palermo

(57) ABSTRACT

A shaft depressor is used for seating a shaft against a closed, usually curved, portion between first and second sides of a U-shaped socket in a slap yoke of a steering shaft assembly. It is used together with a clamp bolt which extends through a hole in the first side of the socket and fastens to threads at a second parallel side thereof. The shaft depressor consists of a cylindrical body having an inside diameter sized to fit over the clamp bolt, an outside diameter sized to pass through the hole in the first side of the U-shaped socket, and projecting members for pressing the shaft into the closed portion of the socket. The shaft depressor has a tapered lead at one end for easy insertion through the hole in the first parallel side and a plurality of fins projecting radially outwardly from the surface of the cylindrical bushing. The radially projecting fins may be axially extending ridges, circumferential ridges, cones, or a single helical ridge on the surface of the cylindrical body.

6 Claims, 2 Drawing Sheets

SHAFT DEPRESSOR FOR A SLAP YOKE IN A STEERING ASSEMBLY

BACKGROUND OF THE INVENTION

This invention relates generally to yokes in flexible shaft assemblies with clamp bolts for securing the yokes on shafts. More particularly, it relates to slap yokes, such as are used in vehicle steering columns and other rotary-drive devices, having clamp bolts which not only clamp the yoke to the shaft but also help to position the shaft within the yoke during clamping.

Rotary shafts are commonly connected using yokes with universal joints to allow for variable misalignments between coupled members. Slap yokes are often used for such connections. They are formed in a U-shaped configuration to provide a socket having holes in its walls for a transverse bolt to provide clamping force to hold the yoke on the shaft. During assembly, the shaft is laid into the U-shaped socket, pressed against the closed side of the socket, and clamped in place by tightening a bolt inserted through the holes in the walls of the socket. The shaft is also usually formed with an undercut section to coincide with the bolt location and to confine the axial location of the yoke on the shaft within a designed range. It is necessary to force the shaft against the bottom of the U-shaped socket in order to correctly align the yoke and the shaft so that the axes of the two parts are concentric. This is usually accomplished by features of the yoke or bolt which provide a radial force against the shaft, from the open side of the U-shaped portion of the yoke, to force the shaft against the closed side.

One approach to radially pressing the shaft against the socket is to provide wedge-shaped features at the sides of the yoke which bear against the shaft when the bolt is tightened and force the bolt down against the yoke. Another method employs a nut and a cam bolt which has a single or multi-lobed axial form along its center and which wedges by cam action against the shaft when torque is applied to the bolt. These and other even more complex methods have been successfully used to provide the required alignment and clamping. All, however, require handling of an excessive number of pieces during installation in close quarters, or they require components which include costly features.

In general, slap yokes for steering columns are provided with a fixed nut, a rotatable trapped nut, or a threaded hole in the second wall. This is done so that the assembly can be completed and tightened from one side; because of the difficulty of reaching into the very limited space available in the vehicle. Because of the cramped assembly conditions, it is necessary to have some way of assuring, without being able to actually see it, that the shaft is firmly seated in the socket of the yoke before the clamp bolt is tightened.

The foregoing illustrates limitations known to exist in present rotary-drive shaft connectors. Therefore, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a shaft depressor for use in a slap yoke with a U-shaped socket for receiving a shaft, a clamp bolt extending between a first side and a second side thereof, said shaft depressor comprising a cylindrical bushing having an inside diameter sized to fit over said clamp bolt, and means for pressing said shaft into the closed portion of said socket.

The foregoing and other aspects will become apparent from the following detailed description of the invention when considered in conjunction with the accompanying drawings.

DETAILED DESCRIPTION

Figures 1, 2:
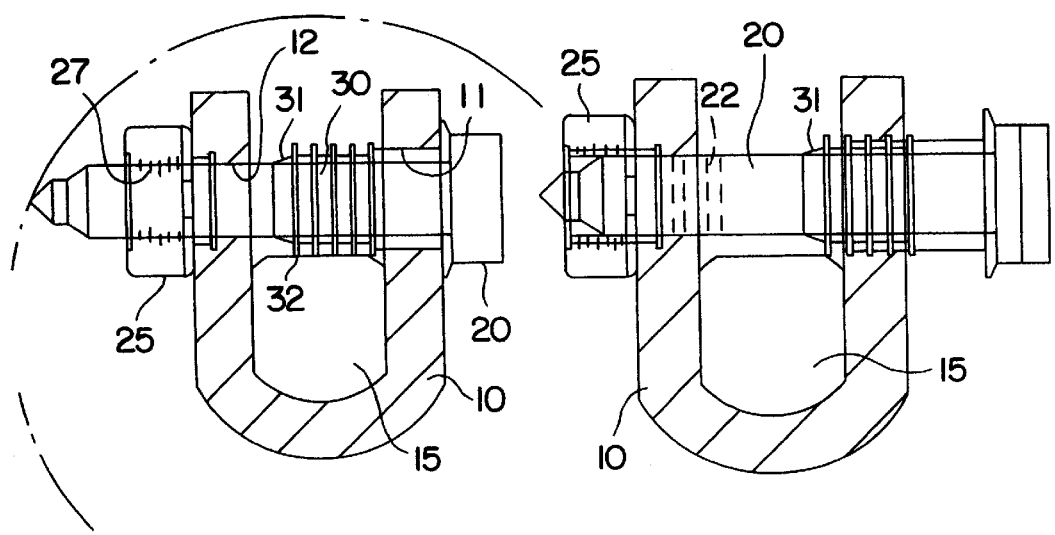
FIG. 1 is a partial transverse section through the socket of a slap yoke in a clamped condition employing the shaft depressor of the invention.
FIG. 2 is a similar view as in FIG. 1 in an unclamped condition.

FIGS. 1 and 2 show a cross sectional view in clamped and unclamped condition, respectively, through a U-shaped socket 10 of a slap yoke to illustrate the shaft depressor 30 of the invention. The shaft 15 is seated and pressed into contact in the saddle, or closed end, of the socket 10 by the shaft depressor 30 which is mounted on the clamping bolt 20. The shaft depressor 30 comprises a hollow cylindrical body having an inside diameter sized to fit over the clamping bolt 20. The bolt 20 extends through the unthreaded hole 11 in the first side of the socket, past the shaft 15, and through the threaded nut 25, which is fixed against rotation to the yoke socket 10 at the unthreaded hole 12 in the second side of the socket. The threads 22 of the bolt 20 engage with threads 27 of the nut 25 and allow the bolt 20 to provide the clamping force to retain the shaft 15 within the socket 10 of the slap yoke. Alternatively, the nut can be eliminated, and a threaded hole 14 can be provided instead, as in FIG. 4.

The shaft depressor 30 has an overall length (best seen in FIGS. 2, 3 and 4) such that it rests against the head of the clamp bolt 20 and is driven into position by the head of the bolt when installed. When fully clamped, it extends from the bolt head through the first wall of the socket 10 to the second wall. It also has a taper 31 at its leading end, so that, as it is inserted on the bolt 20 through the hole 11 of the socket 10, it climbs over the shaft 15 and leads the depressor over the shaft to push the shaft firmly against the closed side of the U-shaped socket to provide proper axial alignment between the shaft and yoke.

Figures 3, 4:
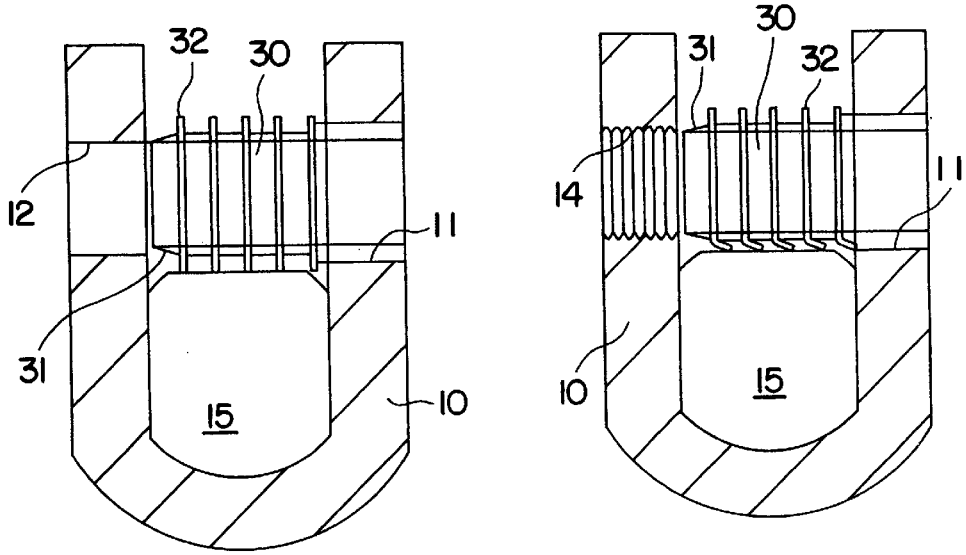
FIG. 3 is another transverse section of a slap yoke socket with a shaft, showing the shaft depressor of the invention with a minimum interference fit.
FIG. 4 is another view as in FIG. 3 with maximum interference between the shaft and the shaft depressor.
Figure 5:
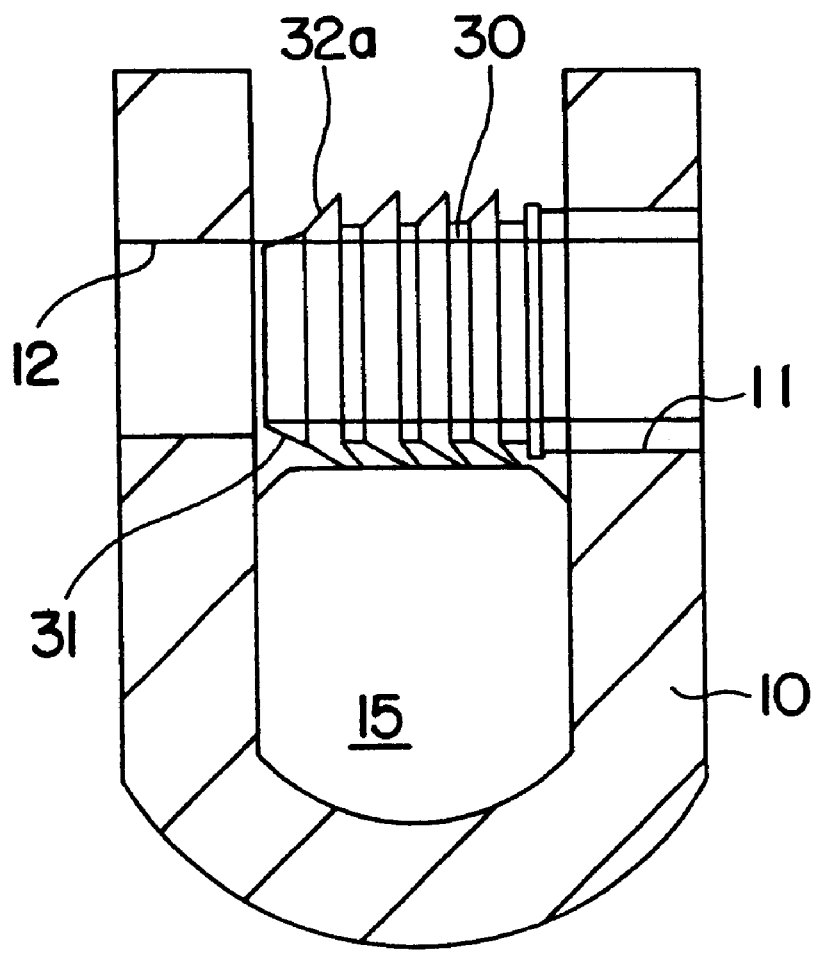
FIG. 5 is another view similar to FIG. 4 showing an alternative embodiment.

The ribs 32 which project radially from the surface of the shaft depressor 30 provide the lateral force needed to press against the shaft 15 without jamming and to seat in the yoke. The ribs 32 are shown as individual circumferential fin-like features, but they also can be made as a single helical screw flight, as axial fins, or even as multiple radially projecting cones, ribs 32a of FIG. 5. The only requirement is that they provide the moderate pressure required to seat the shaft 15 in the socket 10 before clamping. These projections are designed to accommodate fit tolerances between the shaft 15 and the socket 10 of the yoke. By their ability to deform, they assure that the bolt 20 and depressor 30 can pass over the shaft 15 at all clearances between minimum and maximum interference while still providing the lateral force needed to seat the shaft within the socket 10 (FIGS. 3 and 4). Thus, they permit manufacture of yokes and shafts to ordinary easily attained tolerances.

FIGS. 3 and 4 show the two extreme conditions of fit for the shaft depressor 30 of the invention. FIG. 3 shows the minimum interference condition, less than which the depressor will not function; because it will not contact the shaft. FIG. 4 shows the maximum interference, more than which would be excessive and might prevent assembly of the yoke or jam and cause damage to the depressor and/or the yoke, if forced.

Reviewing all the figures, especially FIGS. 3 and 4, the features of the shaft depressor 30 can be appreciated in conjunction with some of the features of the socket 10 of the slap yoke. The socket has a hole 11 in one side and another hole 12, 14 in the other side. Hole 14 is threaded to accept threads 22 of the bolt 20 directly. Hole 12 is not threaded and must be used with a fixed nut, as in FIG. 1, to accept the threads 22 of the bolt.

Hole 11 is large enough for the radially projecting ribs 32 of the shaft depressor 30 to pass through on the bolt. When installed, the ribs press the shaft 15 into the closed end of the U-shaped socket so that it is properly axially positioned when the clamp bolt 20 is tightened.

The shaft depressor 30 may be preferably made from a polymer having elastic properties suitable for providing the lateral force on the shaft 15 needed to assure alignment with the socket 10 of the yoke. Of course, if a single use shaft depressor is desired (one which must be replaced if the shaft is removed and reinstalled) the shaft depressor may be made from a material which plastically deforms on installation but still resists such deformation sufficiently to provide the required lateral force on the shaft.

Having described the invention, we claim:

1. A slap yoke used in a rotatable assembly and having a socket formed in a U-shape for receiving a rotatable shaft, said socket having two opposed and aligned holes, comprising:

a threaded clamping bolt for insertion in holes of the opposed sides of the socket for clamping said rotatable shaft in said yoke, the clamping bolt having a head for engaging a first side of the U-shaped socket and threads for fastening to a second side of said socket; and a shaft depressor comprising a hollow cylindrical body for placement on the clamping bolt, the shaft depressor having a deformable outer portion for engagement with the shaft during insertion of the clamping bolt into the slap yoke, for urging said rotatable shaft into firm contact with the closed side of the U-shaped socket.

2. The slap yoke of claim 1, wherein the deformable outer portion for urging said rotatable shaft into firm contact with the closed side of the U-shaped socket comprises at least one radially projecting member.

3. The slap yoke of claim 2, wherein the at least one radially projecting member comprises a continuous helical fin.

4. The slap yoke of claim 2, wherein the at least one radially projecting member comprises a plurality of radially extending fins.

5. The slap yoke of claim 2, wherein the at least one radially projecting member comprises a plurality of conic forms.

6. A The slap yoke of claim 1, wherein the shaft depressor further comprises a tapered lead on at least one end of said hollow cylindrical body.

* * * * *